United States Patent [19]

Blake

[11] 4,089,506
[45] May 16, 1978

[54] GATE VALVE

[75] Inventor: Larry Webster Blake, Costa Mesa, Calif.

[73] Assignee: American Hospital Supply Corporation, Evanston, Ill.

[21] Appl. No.: 761,602

[22] Filed: Jan. 24, 1977

[51] Int. Cl.² ............................................. F16K 3/28
[52] U.S. Cl. .................................. 251/196; 251/326; 251/327
[58] Field of Search ....................... 251/327, 326, 196

[56] References Cited

U.S. PATENT DOCUMENTS

| 2,316,981 | 4/1943 | Smith | 251/326 |
| 3,457,950 | 7/1969 | Over | 251/327 X |
| 4,010,928 | 3/1977 | Smith | 251/327 X |

FOREIGN PATENT DOCUMENTS

| 898,615 | 6/1962 | United Kingdom | 251/327 |
| 919,911 | 2/1963 | United Kingdom | 251/327 |

Primary Examiner—Arnold Rosenthal
Attorney, Agent, or Firm—Tilton, Fallon, Lungmus & Chestnut

[57] ABSTRACT

A gate valve for use with a catheter including an elongated valve body having a transversely extending slide chamber and a slide member slidably supported in the slide chamber for transverse sliding movement between first and second positions. The slide chamber is defined in part by a pair of longitudinally spaced valve surfaces having longitudinally aligned inlet and outlet ports with the slide member having an enlarged opening extending therethrough also in a direction longitudinally of the valve body. A resilient insert element is carried within the opening in the slide member and is longitudinally moveable and self-adjustable therein with a longitudinal dimension in an uncompressed state greater than the distance between the valve surfaces of the slide chamber. The resilient insert element is supported in a state of longitudinal compression within the slide chamber and is in continuous sealing contact with the opposing valve surfaces regardless of whether the slide member is in its first position, or its second position, or is being moved between these positions. A longitudinal bore of the insert element is disposed in alignment with the inlet and outlet ports when the slide member is in its first position and is positioned out of alignment with these ports when the slide member is in its second position.

22 Claims, 8 Drawing Figures

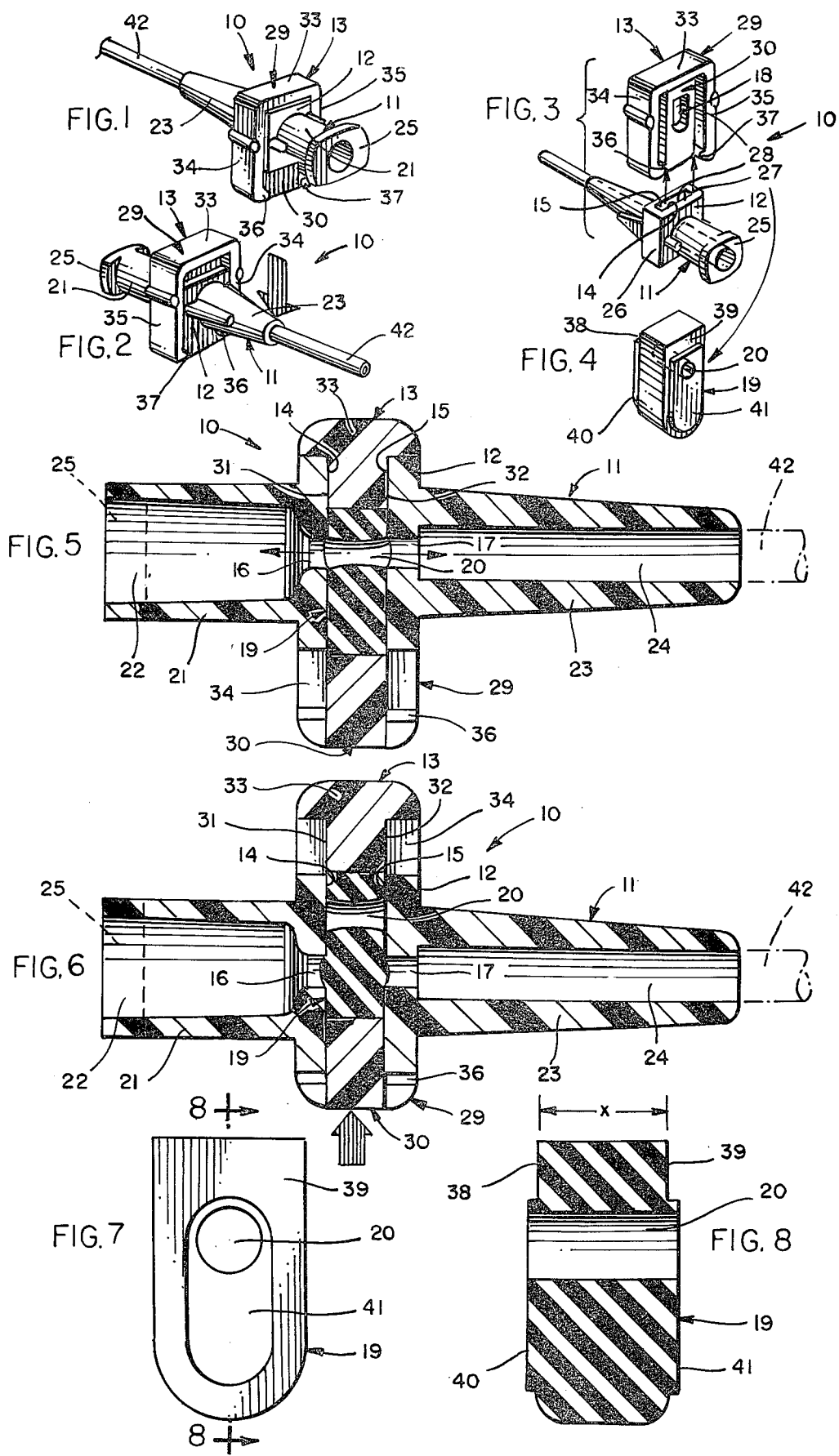

GATE VALVE

BACKGROUND

This invention relates to a gate valve and, more particularly, to a gate valve for use with a catheter.

Catheters of the balloon type usually use one of several different types of shut-off valves. The valves are used to control the inflation and deflation of the balloon after the catheter has been placed in a desired position. It is important for the valves to present leakage during use even after extended periods of shipment and storage and to be easily handled for fast and accurate control during inflation and deflation. The valves previously provided for these purposes are usually rotary valves, pinch valves, or automatic valves. However, no shut-off valve has been found to be completely satisfactory under nearly all conditions of use with a balloon type catheter.

Rotary valves, which are also known as "plug" valves, are usually of either two-way or three-way design. The two-way design is either off or on whereas the three-way design is either off or on in two positions. These valves incorporate a rotating shaft having a lateral hole through it which can be selectively lined up with another hole or holes for the desired operating position. The two-way design as well as the three-way design are known to leak, however, especially using a gas such as carbon dioxide or air. While rotary valves are suitable in theory, the greases used with metal rotary valves tend to "creep" out of the sealing areas and the plastics used in plastic rotary valves tend to distort the sealing areas during ethylene oxide sterilization.

Pinch valves incorporate a clamp or wedge which is either off or on. The clamp or wedge is used to distort the catheter body tubing until it is occluded when the valve is in an off position. While pinch valves are relatively simple, they tend to remain permanently "off" when such valves are subjected to extended storage in an off position or are sterilized in that position.

Automatic valves incorporate an elastomeric seal inside a hub. The seal maintains the valve in an off position until a syringe is pushed into the fitting compressing the seal and opening it. While automatic valves are relatively simple, they will tend to remain open after the syringe is removed.

Catheters of the balloon type, particularly those used for hemodynamic measurements, require precise inflation and deflation of the balloon. It is particularly important to avoid overinflation and possible balloon rupture in such applications. The balloon should therefore always be deflated before injecting additional carbon dioxide or air in the event that it is believed that the balloon may have deflated to an extent to which its flow directed characteristics are lost. It is characteristic of existing shut-off valves, however, that the handling of the valve has been rather difficult and cumbersome leading to the possibility of inflation or deflation errors. While the prior art has dealt with the problems associated with valves provided for use with balloon type catheters with varying degrees of success, the present invention represents an improvement over all such prior art constructions.

SUMMARY

Briefly stated, the present invention is directed to a gate valve for use with a catheter including an elongated valve body having a transversely extending slide chamber and a slide member slidably supported in the slide chamber for transverse sliding movement between first and second positions. The slide chamber is defined in part by a pair of longitudinally spaced valve surfaces having longitudinally aligned inlet and outlet ports with the slide member having an enlarged opening extending therethrough also in a direction longitudinally of the valve body. A resilient insert element is carried within the opening in the slide member and is longitudinally moveable and self-adjustable therein having a longitudinal dimension in an uncompressed state greater than the distance between the valve surfaces of the slide chamber. The "floating" resilient insert element is therefore in a state of longitudinal compression when the parts are assembled and is in continuous sealing engagement with the valve surfaces of the housing regardless of the position of adjustment of the slide member. A longitudinal bore through the insert element is in alignment with the inlet and outlet ports when the slide member is in its first position and is positioned out of alignment with such ports, thereby closing the valve, when the slide member is in its second position.

In a preferred embodiment, the longitudinally spaced valve surfaces are generally planar and lie along substantially parallel planes. The slide member includes a frame portion and a tongue portion with the tongue portion slidably supported in the slide chamber by the frame portion and preferably projecting through that chamber. The frame portion of the slide member straddles the slide chamber and likewise extends laterally beyond the elongated valve body. The frame portion advantageously includes a shoulder terminating at its outer ends in a pair of depending arms with the pair of arms and shoulder being generally C-shaped. The frame portion also advantageously includes stop means associated therewith limiting transverse sliding movement of the tongue portion in the slide chamber between the first and second positions of the slide member.

When the parts are assembled, the resilient insert element is disposed in the slide chamber with at least the externally enlarged central portion thereof in a state of compression. The longitudinal bore in the resilient insert element passes through that enlarged central portion and it is the outer surfaces of that portion which slidably and sealingly engage the valve surfaces of the chamber or housing in all positions of adjustment of the slide member.

The present invention therefore retains the advantages inherent in valves used with catheters while at the same time providing an improved construction that eliminates the problems associated with such valves in the past. It is an object of the present invention to provide a gate valve for use with a catheter having a slide member with an enlarged resilient insert element that effectively precludes leakage due to distortion or "creep" during ethylene oxide sterilization and which can be operated single handedly with the mode of operation being quickly identifiable. The provision of the gate valve and the realization of the advantages to be derived therefrom constitute additional important objects of the present invention with still other objects to be appreciated from consideration of the details of construction and operation set forth in the accompanying specification, claims and drawings.

DRAWINGS

The invention is described in conjunction with the accompanying drawings, in which:

FIG. 1 is a perspective view of a gate valve for use with a catheter in an open position in accordance with the present invention;

FIG. 2 is a perspective view of a gate valve for use with a catheter in a closed position in accordance with the present invention;

FIG. 3 is an exploded perspective view of the gate valve of FIGS. 1 and 2 with the resilient insert element removed from the slide member;

FIG. 4 is an enlarged perspective view of the resilient insert element removed from the gate valve of FIG. 3;

FIG. 5 is an axial cross-sectional view of the gate valve of FIG. 1;

FIG. 6 is an axial cross-sectional view of the gate valve of FIG. 2;

FIG. 7 is a front elevational view of the resilient insert element of FIG. 4; and FIG. 8 is a cross-sectional view of the resilient insert element taken on the line 8—8 of FIG. 7.

DESCRIPTION

In the illustration given and with reference first to FIG. 1, the numeral 10 designates generally a gate valve for use with a catheter in accordance with the present invention. The gate valve 10 includes an elongated valve body 11 having a transversely extending slide chamber 12 and a slide member 13 slidably supported in the slide chamber 12 for transverse sliding movement between a first or open position (as shown in FIGS. 1 and 5) and a second or closed position (as shown in FIGS. 2 and 6). The slide chamber 12 is defined in part by a pair of longitudinally spaced valve surfaces 14 and 15 (as shown in FIGS. 5 and 6) having respective longitudinally aligned inlet and outlet ports 16 and 17 with the slide member 13 having an enlarged opening 18 extending therethrough (as shown in FIG. 3) also in a direction longitudinally of the elongated valve body 11. The gate valve 10 further includes a resilient insert element 19 carried within the opening 18 which is longitudinally moveable and self-adjustable therein having a longitudinal dimension in an uncompressed state greater than the distance between the valve surfaces 14 and 15. When the gate valve 10 is fully assembled, the resilient insert element 19 is disposed within the slide chamber 12 in a state of longitudinal compression having a longitudinal bore 20 alignable with the inlet and outlet ports 16 and 17 (as shown in FIG. 5) when the slide member 13 is in its first or open position and sealingly engageable with the inlet and outlet ports 16 and 17 (as shown in FIG. 6) when the slide member 13 is in its second or closed position.

The elongated valve body 11 includes an inlet portion 21 having a passageway 22 extending therethrough in communication with the inlet port 16 and an outlet portion 23 having a passageway 24 extending therethrough in communication with the outlet port 17. The passageways 22 and 24 extending through the inlet and outlet portions 21 and 23 (as shown in FIGS. 5 and 6) are longitudinally aligned bores which are concentric with the inlet and outlet ports 16 and 17. The elongated valve body 11 further includes a transversely extending collar or flange 25 integral with the inlet portion 21 at its outer end for purposes to be described hereinafter.

Referring to FIGS. 3 and 5, the longitudinally spaced valve surfaces 14 and 15 are generally planar lying in substantially parallel planes. The slide chamber 12 is further defined by a pair of laterally spaced side portions 26 and 27 (as shown in FIG. 3) which along with the valve surfaces, define a transverse opening 28 of generally rectangular cross-section for slidably receiving the slide member 13. Side portions 26 and 27 are therefore also generally planar and lie in substantially parallel planes.

The slide member 13 projects through the slide chamber 12 extending beyond the elongated valve body 11. It includes a frame portion 29 and a tongue portion 30 (as shown in FIG. 3) with the tongue portion 30 being slidably supported in the slide chamber 12 by the frame portion 29 which straddles the slide chamber 12. The tongue portion 30 projects through the slide chamber 12 with both the frame portion 29 and the tongue portion 30 extending beyond the elongated valve body 11.

Referring to FIGS. 5 and 6, the tongue portion 30 includes a pair of longitudinally spaced faces 31 and 32 with the faces 31 and 32 having a longitudinal dimension between them slightly less than the distance between the valve surfaces 14 and 15. The frame portion 29 includes a shoulder 33 terminating at its outer ends in a pair of depending arms 34 and 35 with the pair of arms 34 and 35 and the shoulder 33 being generally C-shaped. The frame portion 29 also includes a pair of fingers 36 and 37 with one of the fingers projecting inwardly from the end of each of the arms 34 and 35 remote from the shoulder 33. The fingers 36 and 37 and the shoulder 33 define stop means limiting transverse sliding movement of the tongue portion 30 between first and second positions of the slide member 13.

The enlarged opening 18 in the slide member 13 is generally U-shaped in outline and the resilient insert element 19 carried in the enlarged opening 18 is likewise of corresponding U-shaped outline. As shown in FIGS. 7 and 8, the insert element 19 has an enlarged central portion with faces or surfaces 40 and 41 spaced apart (when the insert element is uncompressed) a distance greater than the distance between valve surfaces 14 and 15, the later dimension being indicated in FIG. 8 by the letter "x". It will be observed that although the opening 20 does not extend through the center of surfaces 40 and 41, and even though the opening 20 is not located at the mid-point of the slide member 13 when the insert element 19 is positioned within the enlarged opening 18, there is nevertheless no danger that the parts might be incorrectly assembled because the rounded end of the insert element 19 must always be oriented to fit into the rounded end of the opening 18 and because the slide member 13 cannot be inserted incorrectly into the symmetrical chamber 12.

The surfaces 40 and 41 of the enlarged portion sealingly engage the valve surface 14 and 15 about the inlet and outlet ports 16 and 17 when the bore 20 is in alignment with the posts 16 and 17 (as shown in FIG. 5) with the slide member 13 in its first position, and such surfaces sealingly engage the surfaces about the inlet and outlet ports 16 and 17 when the bore 20 is out of alignment with the ports 16 and 17 (as shown in FIG. 6) with the slide member 13 in its second position. The frame portion 29 straddles the slide chamber 12 extending beyond the elongated valve body 11 to facilitate shifting the slide member 13 from its first position to its second position and back again.

Referring to FIGS. 5 and 6, the advantages of the gate valve 10 can be more fully appreciated. The valve 10 is placed in an open position (as shown in FIG. 5) by pushing downward on the slide member 13 until the under surfaces of the shoulder 33 are resting against the upper ends of the valve surfaces 14 and 15. The longitudinal bore 20 in the resilient insert element 19 will then be longitudinally aligned with the inlet and outlet ports 16 and 17. A syringe or other fluid supplying device can then be inserted into the inlet portion 21 of the elongated valve body 11 with the periphery of the syringe resting against the collar or flange 25. The fluid (usually gas) is forced through the passageway 22 in the inlet portion 21, the inlet port 16, the bore 20, the outlet port 17 and the passageway 24 in the outlet portion 23 into a tube 42, for instance, to inflate a balloon of a balloon type catheter. When the balloon has been fully inflated, the gate valve 10 can then be closed by pulling upward on the slide member 13 until the fingers 36 and 37 are in contact with the lower ends of the valve surfaces 14 and 15.

With the gate valve 10 in a closed position (as shown in FIG. 6) the longitudinal bore 20 is out of alignment with the inlet and outlet ports 16 and 17. The surfaces 40 and 41 of the resilient insert element 19 sealingly engage the surfaces about and within inlet and outlet ports 16 and 17 when the slide member 13 is in this position thereby preventing leakage which might otherwise cause deflation of the balloon. With the resilient insert element 19 bulging into the inlet and outlet ports 16 and 17 (as shown in FIG. 6), the seal is extremely effective.

When it is later desired to deflate the balloon, the slide member 13 is again pushed downward until the under surfaces of the shoulder 33 are resting against the upper ends of the valve surfaces 14 and 15. The longitudinal bore 20 in the resilient insert element 19 will then again be longitudinally aligned with the inlet and outlet ports 16 and 17 (as shown in FIG. 5) which will permit the fluid in the balloon to escape through the passageway 24 in the outlet portion 23, the outlet port 17, the longitudinal bore 20, the inlet port 16, and the passage 22 in the inlet portion 21. While the fluid in the balloon will escape for the most part on its own, it is also possible to again use a syringe or similar device to draw all of the remaining fluid from the balloon to assure complete deflation before removing the balloon type catheter.

With the gate valve 10 of the present invention, virtually all of the problems heretofore associated with the prior art have been eliminated. The resilient insert element 19 can be of a suitable solid plastic to provide an elastomeric seal which will "give", i.e., stretch and compress during ethylene oxide sterilization and during shipment and subsequent long term storage to overcome the distortion and "creeping" problems normally encountered. The gate valve 10 also can be operated with a single hand leaving the user's other hand free for other tasks. The elongated valve body 11 and the slide member 13 can also be provided with an arrow and an arrow shaft to indicate an open position when the two are aligned (as shown in FIG. 1) and a closed position when they are offset (as shown in FIG. 3). With these and other features described hereinabove, the gate valve 10 of the present invention may be constructed of durable plastic materials to operate in a highly effective and reliable manner.

It is to be noted that the elongated valve body and slide member are symmetrical in all critical respects so that it is impossible to assemble the gate valve backwards or upside down. On the other hand, the resilient insert element is non-symmetrical relative to a horizontal line when viewed as in FIG. 7; therefore, despite the off-center location of opening 20, the insert element cannot be inadvertently positioned in slide opening 18 in an incorrect position. The gate valve is assembled by merely inserting element 19 into the slide member and then snapping the slide member onto the body, a relatively simple operation in comparison with the assembly of existing valves that must be glued, solvent bonded, ultrasonically welded, etc., often resulting in excessive damage to the valve parts and ensuing high scrap rates.

While in the foregoing specification of detailed description of the invention has been set forth for purposes of illustration, variations of the details herein given may be made by those skilled in the art without departing from the spirit and scope of the invention.

I claim:

1. A gate valve for a catheter comprising an elongated valve body having a transversely extending slide chamber defined in part by a pair of longitudinally spaced valve surfaces, said pair of valve surfaces having longitudinally aligned inlet and outlet ports, respectively, a slide member slidably supported in said slide chamber for transverse sliding movement between first and second positions, said slide member having an enlarged opening extending therethrough in a direction longitudinally of said valve body, and a resilient insert element carried within said opening and being longitudinally movable and self-adjustable therein, said resilient insert element having a longitudinal dimension in an uncompressed state greater than the distance between said valve surfaces being disposed within said slide chamber in a state of longitudinal compression, said resilient insert element having a longitudinal bore in alignment with said inlet and outlet ports when said slide member is in its first position and having surfaces sealingly engageable with said valve surfaces around said inlet and outlet ports when said slide member is in both of its positions.

2. The gate valve of claim 1 in which said valve body includes an inlet portion having a passageway extending therethrough in communication with said inlet port and an outlet portion having a passageway extending therethrough in communication with said outlet port.

3. The gate valve of claim 2 in which said passageways extending through said inlet and outlet portions are longitudinally aligned bores.

4. The gate valve of claim 3 in which said longitudinally aligned bores extending through said inlet and outlet portions are concentric with said longitudinally aligned ports.

5. The gate valve of claim 3 in which said inlet portion includes a transversely extending collar integral therewith at its end remote from said inlet port.

6. The gate valve of claim 3 in which the diameter of said bore in said inlet portion is substantially greater than the diameter of said bore in said outlet portion.

7. The gate valve of claim 1 in which said longitudinally spaced valve surfaces are generally planar, said pair of valve surfaces lying in substantially parallel planes.

8. The gate valve of claim 7 in which said slide chamber is further defined by a pair of laterally spaced side portions, said pair of side portions being integral with corresponding ends of said pair of valve surfaces.

9. The gate valve of claim 8 in which said laterally spaced side portions are generally planar, said pair of side portions lying in substantially parallel planes.

10. The gate valve of claim 9 in which said slide chamber is further defined by an opening of generally rectangular cross-section therethrough to slidably receive said slide member, said pairs of side portions and valve surfaces defining said opening.

11. The gate valve of claim 1 in which said slide member projects through said slide chamber extending beyond said elongated valve body.

12. The gate valve of claim 1 in which said slide member includes a frame portion and a tongue portion, said tongue portion slidably supported in said slide chamber by said frame portion.

13. The gate valve of claim 12 in which said tongue portion projects through said slide chamber extending beyond said elongated valve body.

14. The gate valve of claim 12 in which said tongue portion includes a pair of longitudinally spaced faces, said pair of faces having a longitudinal dimension slightly less than the distance between said valve surfaces.

15. The gate valve of claim 12 in which said frame portion straddles said slide chamber extending beyond said elongated valve body.

16. The gate valve of claim 12 in which said frame portion includes a shoulder terminating at its ends in a pair of depending arms, said pair of arms and shoulder defining a generally C-shaped frame portion.

17. The gate valve of claim 16 in which said frame portion includes stop means limiting transverse sliding movement of said tongue portion between first and second positions of said slide member.

18. The gate valve of claim 17 in which said frame portion includes a pair of fingers with one of said fingers projecting inwardly from the end of each of said arms remote from said shoulder, said fingers and said shoulder defining said stop means.

19. The gate valve of claim 12 in which said enlarged opening in said slide member is generally U-shaped extending through said tongue portion.

20. The gate valve of claim 19 in which said resilient insert element carried in said enlarged opening is generally U-shaped to conform to said generally U-shaped enlarged opening in said tongue portion.

21. The gate valve of claim 1 in which said resilient insert element has an enlarged central portion defined by a pair of longitudinally spaced outer surfaces, said outer surfaces having a longitudinal dimension between them, when said element is in an uncompressed state, greater than the distance between said valve surfaces.

22. The gate valve of claim 21 in which said longitudinal bore passes through said enlarged portion of said resilient insert element, said surfaces of said enlarged portion sealingly engaging said valve surfaces adjacent said inlet and outlet ports when said bore is in alignment with said ports with said slide member in its first position and said surfaces of said enlarged portion sealingly engaging said valve surfaces about said inlet and outlet ports when said bore is out of alignment with said ports with said slide member in its second position.

* * * * *